United States Patent [19]
Leighton, Sr.

[11] 3,898,561
[45] Aug. 5, 1975

[54] TESTER FOR ELECTRICAL DEVICES
[75] Inventor: Thomas H. Leighton, Sr., Stevensville, Mich.
[73] Assignee: Heath Company, Benton Harbor, Mich.
[22] Filed: Aug. 20, 1973
[21] Appl. No.: 389,800

[52] U.S. Cl. .......................... 324/158 R; 324/28 R
[51] Int. Cl. .............................................. G01r 31/02
[58] Field of Search ............ 324/158 R, 28 R, 73 R, 324/15

[56] References Cited
UNITED STATES PATENTS

| | | | |
|---|---|---|---|
| 2,826,737 | 3/1958 | Crumbliss | 324/73 R |
| 3,039,604 | 6/1962 | Bickel et al. | 324/158 R |
| 3,142,797 | 7/1964 | Grant | 324/28 R |
| 3,392,332 | 7/1968 | Christensen | 324/158 R |
| 3,408,562 | 10/1968 | Mazurkevics | 324/28 R |
| 3,437,916 | 4/1969 | Mazurkevics | 324/28 R |

*Primary Examiner*—Alfred E. Smith
*Assistant Examiner*—Ernest F. Karlsen
*Attorney, Agent, or Firm*—William R. Sherman

[57] ABSTRACT

A tester for automobile-type solid state voltage regulators which provides normal and extreme operating condition tests, such as a low temperature-high current test, a high temperature and current test, and a high temperature-low current test. Additionally, the tester provides both low temperature and high temperature tests for other internal circuits of the voltage regulator, such as the battery disconnect protection circuit, the voltage level sensor circuit and the temperature compensation circuit of the regulator. The temperature of the regulator is raised by heating a test chamber which contains the regulator under test and a power transistor which is a part of the supply circuit of the test current provided by the tester.

32 Claims, 3 Drawing Figures

PATENTED AUG 5 1975 3,898,561

SHEET 1

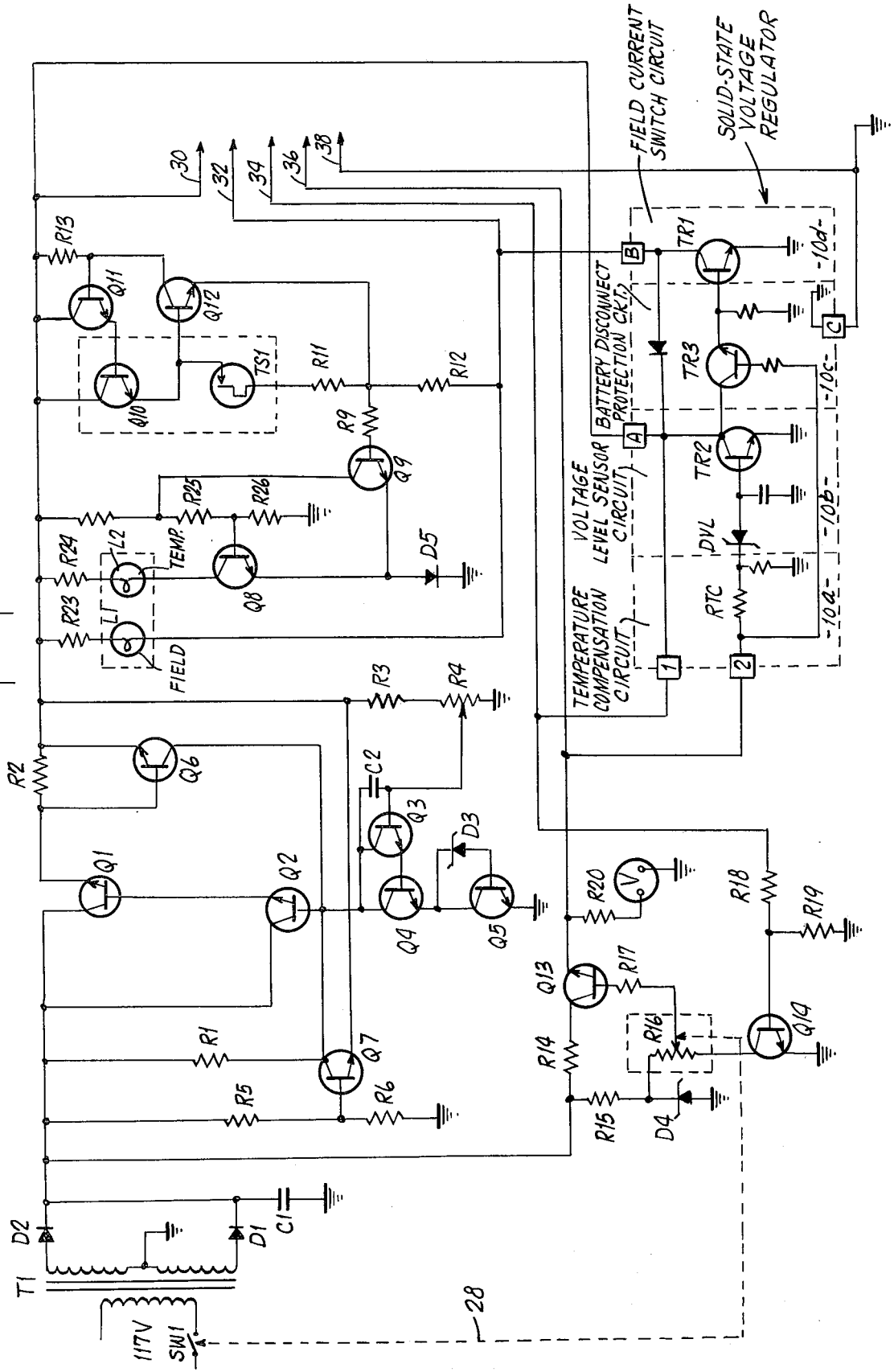

TESTER FOR ELECTRICAL DEVICES

BACKGROUND OF THE INVENTION

The invention is in the field of testing electrical devices such as voltage regulators and specifically automobile type voltage regulators and solid state automobile type voltage regulators.

Most new vehicles and many older vehicles are equipped with solid state voltage regulators, rather than with the older, relay-type regulators. Because solid state voltage regulators are more complex and are more susceptible to damage from improper testing, it is desirable to provide testers which are specifically suitable to solid state voltage regulators.

One prior art example of a tester for solid state voltage regulators is discussed in U.S. Pat. No. 3,581,205 and comprises a rather complex circuit for applying a square wave test signal to an input terminal of a solid state voltage regulator and for counting the square wave pulses that should appear at an output terminal of the regulator, with a certain count of such pulses indicating satisfactory operation of the regulator. Another example of a prior art tester for solid state voltage regulators is disclosed in U.S. Pat. No. 3,629,704 and comprises another rather complex circuit which connects to a solid state voltage regulator in situ (in the car) and analyzes the waveform and magnitude of the ripple voltage superimposed on the alternator output, and also senses the voltage level at the field terminal of the alternator. Other examples of testers for voltage regulators, suitable primarily for the older, relay-type regulators, are disclosed in the following U.S. Pats.: 2,582,460, 2,598,802, 2,611,806, 2,623,925, 2,638,495, 2,826,737, 3,058,062, 3,142,797, and 3,408,562.

A portion of the prior art discussed above relates to testing automobile voltage regulators in the car, without disconnecting them from the associated circuitry of the automobile electrical system. While this may be a fast and convenient procedure, it is subject to errors because of the influence of this associated circuitry on the operation of the voltage regulator. Further, this procedure is generally not suitable for solid state voltage regulators because of the danger of damaging the circuitry of the regulator and the alternator and the associate diode and rectifier bridge circuitry of the car electrical system. Still further, these in situ testers do not simulate the entire range of possible operating environment for the regulator but test it only in whatever environment it is at the time of the test. This may not detect failures occurring at other operating conditions.

The remainder of the prior art discussed above relates to removing the voltage regulator from the car and then attaching it to a tester. This is a preferred procedure but the prior art discussed above does not show simulating the entire range of operating conditions for the voltage regulator under test, and for testing each of the circuits of the voltage regulator. For example, a voltage regulator which operates satisfactorily at a certain temperature range may fail at a higher temperature, or vice versa. Similarly, a voltage regulator that operates satisfactorily at high input current may fail at low input current, or vice versa.

It is desirable therefore to test a device, such as a solid state voltage regulator, when it is disconnected from its associated circuitry, so as to prevent misleading influences of such circuitry, and it is desirable to test it through the entire range of operating conditions to which it may be subjected, including the extremes of such operating conditions, so as to ensure a great likelihood that all possible failures will be detected. The subject invention is directed to providing a tester and a method of testing that meet these desirable ends.

SUMMARY OF THE INVENTION

An object of the invention is to provide a tester for electrical devices, such as voltage regulators and specifically automobile-type solid state voltage regulators, which thoroughly tests all circuits of a device under test and which simulates both normal and extreme operating conditions to which the device may be subjected in its life.

Another object of the invention is to provide a method for so testing devices of this type.

One embodiment of the invention is a tester for solid state voltage regulators of the type used in automobiles (e.g., in General Motors automobiles). These regulators generally include a field current switch, a battery disconnect protection circuit, a voltage level sensor circuit and a temperature compensation circuit. The tester tests the field current switch at low temperature and high current, at high temperature and high current and at high temperature and low current. Additionally, the tester tests, at both high and low temperature, the battery disconnect protection circuit, the voltage level sensor circuit, and the temperature compensation circuit. Still additionally, the tester tests various internal connections of the voltage regulator. The tests are designed to simulate both normal and extreme operating conditions of the voltage regulator under test.

One important aspect of the invention relates to the manner of controlling the temperature of the regulator under test. The tester includes a chamber which receives the regulator that is being tested and includes a power transistor forming a part of the tester circuit supplying high test current. Once the regulator is in the test chamber, high test current is applied to it through that power transistor, with the result that at the start of the test procedure the temperature inside the test chamber is relatively low, but rapidly increases because of the heat dissipated by the power transistor. Thus, high current is applied to the regulator at low temperature at the beginning of the test procedure, but high current is applied at a high temperature of the regulator at some later time. Then, when the regulator has reached a selected high temperature, the testor automatically discontinues the high current through the power transistor and applies a low test current to the regulator, which at that time is at high temperature. Thus, the regulator is tested at both high and low current at said high temperature.

Other important aspects of the invention are discussed specifically in the detailed description.

BRIEF DESCRIPTION OF THE DRAWINGS

FIG. 3 is a schematic diagram of an embodiment of the invention electrically connected to an exemplary solid state voltage regulator under test.

DETAILED DESCRIPTION

One embodiment of the invention comprises a tester for electrical devices such as voltage regulators, and specifically automobile type voltage regulators, and more specifically solid state automobile type voltage regulators.

Before proceeding with a description of the tester, it may be helpful to explain briefly the structure and operation of an axemplary solid state automobile type voltage regulator, in order to later appreciate the invented test procedure.

Figure 2:
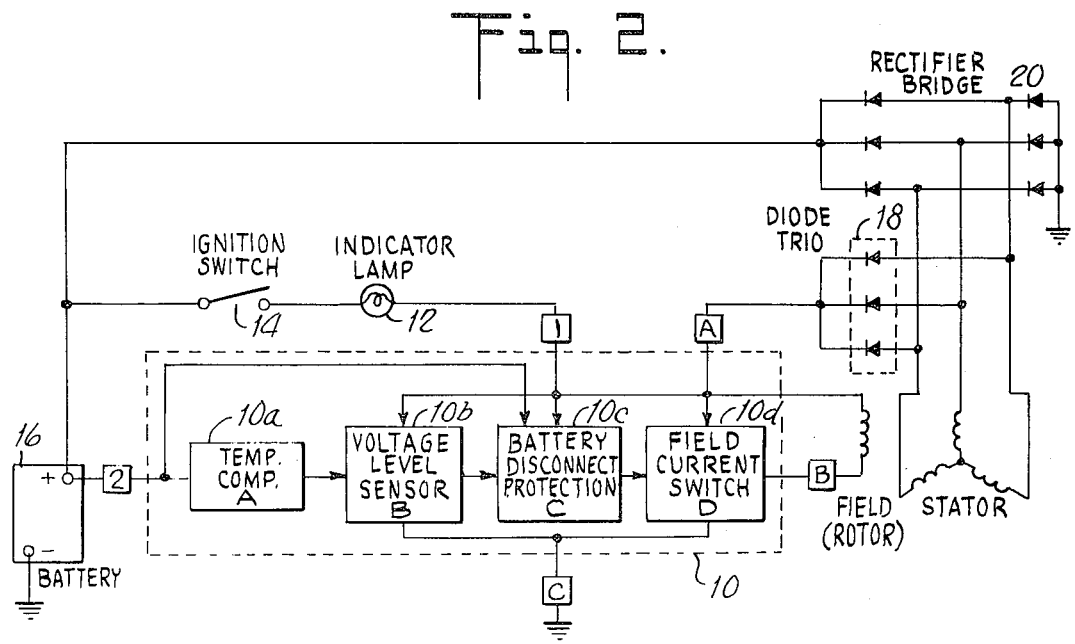
FIG. 2 is partly block and partly schematic diagram of an exemplary solid state voltage regulator connected to its associated circuitry of an automobile electrical system.

Referring to FIG. 2, a typical voltage regulator 10 includes a temperature compensation circuit 10a, a voltage level sensor circuit 10b, a battery disconnection protection circuit 10c and a field current switch circuit 10d. The voltage regulator 10 has terminals 1, 2, A, B, and C, of which terminal 1 connects to the positive terminal of the automobile battery 16 through the conventional automobile generator indicator lamp 12 and through the automobile ignition switch 14, terminal 2 connects directly to the positive terminal of the battery 16, terminal A connects to the output of a diode trio 18 which supplies current from the conventional car alternator, with the same current supplied through a rectifier bridge 20 to the positive terminal battery 16, terminal B connects to one end of the field winding of the alternator, and terminal C is a ground terminal.

When the field current switch circuit 10d is on, it supplies current to the field winding of the alternator; when it is off, it prevents current from flowing through that field winding. Normally, before the car starts, the field current switch circuit 10d is off (i.e., it is an open circuit), and after the car starts, it is on and feeds the field winding with a square wave current; with the average power of that current dependent on how much is required for charging the battery 16. The battery disconnect protection circuit 10c prevents the field current switch circuit 10d from turning on when the battery 16 is disconnected from the regulator and when the ignition switch 14 is open. The voltage level sensor circuit 10b monitors the battery voltage and turns on the field current switch circuit 10d when the battery 16 needs charging in a way which supplies just enough current to the battery. Finally, the temperature compensation circuit 10a varies the charging voltage to the battery 16 with temperature so as to ensure optimum charging voltage.

A specific circuitry of an exemplary voltage regulator 10 is shown in FIG. 3 and will be discussed in greater detail in connection therewith.

It should be noted that the voltage regulator 10 is only one example of the type of electrical devices that can be tested by various embodiments of the invention, and that the invention is equally applicable to testing other suitable electrical devices.

Figure 1:
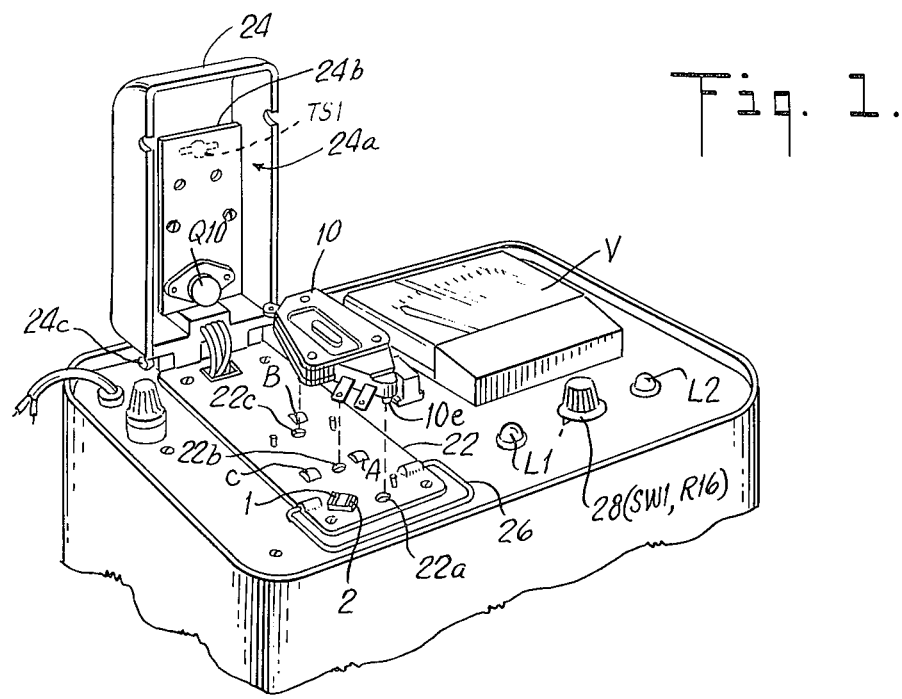
FIG. 1 is a perspective view of a top portion of a tester embodying the invention.

Referring to FIG. 1, the voltage regulator 10 is removed from the car and is placed on a holder bottom 22 which has apertures 22a, 22b, and 22c that receive three corresponding registration pins extending from the bottom of the regulator 10 (only the pin 10e is visible in FIG. 1). Once the voltage regulator is placed on the holder bottom 22, with its registration pins received in the corresponding openings in the bottom holder 22, the regulator terminals 1, 2, A, B, and C make electrical contact with the correspondingly numbered contacts on the bottom holder 22. Then, a hinged holder cover 24 is pivoted about its hinge pin 24c until it is brought down against the holder bottom 22, and a cover retaining spring 26 is pivoted upwardly, over the holder cover 24, to hold it in place. The voltage regulator 10 is then within a test chamber 24a defined by the holder bottom 22 and the inner wall of the holder cover 24, and is ready for testing.

The tester shown in FIG. 1 includes a voltmeter V, a field lamp L1, a temperature lamp L2, and a knob 28 which operates an off-on switch SW1 and a variable resistor R16 whose purpose if explained in conjunction with FIG. 3.

Referring to FIG. 3, a circuit embodying the invention comprises a transformer T1 whose primary is connected to a power line through the off-on switch SW1, which is operated by the knob 28 in FIG. 1. Diodes D1 and D2 are connected to the secondary of the transformer T1 and form a full wave rectifier. The DC output voltage from this rectifier is filtered by capacitor C1. Transistors Q1 through Q5 from a series pass regulator circuit that maintains and regulates the emitter output of Q1 at a selected DC voltage, for example, at approximately 16.5 volts DC. The transistors Q1 and Q2 form a Darlington series pass transistor combination that is driven by the current through a resistor R1. As the output voltage of this Darlington pair increases, the voltage at the wiper of a control pot (variable resistor) R4 also tends to increase, causing the transistors Q3 and Q4, which are also in a Darlington pair combination, to conduct harder. This reduces the base current to transistors Q2 and Q4, which in turn reduces the output voltage of the Darlington pair of Q1 and Q2. Additionally, if the output voltage of Q1 and Q2 decreases, transistors Q3 and Q4 conduct less, thus allowing the base current through Q1 and Q2 to increase. A Zener diode D3 and transistor Q5 form an amplified Zener circuit that establishes the reference voltage for transistor Q4.

Transistor Q6 limits the emitter output current of Q1 to a selected value, for example, approximately 4 amperes by lowering the output voltage of Q1 as required. This happens when the current through and the voltage across a resistor R2 increase to a point that transistor Q6 turns on and reduces the drive to transistors Q1 and Q2.

Transistor Q7 forms a current fold-back circuit that "folds back" (reduces to 0) the current through Q1 when the output voltage of Q1 falls below a selected level, for example, below approximately 10 volts. Resistors R5 and R6 make up a voltage divider that holds the base of Q7 at a fixed value. Then, when the emitter voltage of Q7 (which corresponds to the output voltage of Q1) decreases below the base voltage of Q7, Q7 turns on and decreases the drive to Q1 and Q2. The turn-on of Q7 is regenerative, so it happens very rapidly, and removes all drive to Q2 and Q1.

A constant current source is formed by transistors Q10, Q11, and Q12 and supplies a selected high test current, for example, approximately 3.5 amperes, to terminal B of the voltage regulator 10 that is being tested. Transistor Q10 also serves as the heating element (as described later) to raise the temperature of the regulator 10 under test to a selected level, for example, 240°F. When the temperature reaches that selected value, a thermal switch TS1 (which is in the test chamber 24a) opens and reduces the current to the terminal B of the regulator 10 to a low test current, for example, 0.26 amperes.

Transistors Q8 and Q9 function as switches to turn on the temperature lamp L2 when the selected temperature is reached and the thermal switch TS1 opens. When the thermal switch TS1 is closed, the current through a resistor R12 (this is the high test current) produces a voltage drop sufficient to turn on the transistor Q9. This holds the base of transistor Q8 low to keep it turned off. However, when the thermal switch TS1 opens, the voltage drop across R12 decreases and allows Q9 to turn off. A positive voltage is then applied through resistors R8 and R25 to the base of Q8, turning it on. Transistor Q8 then turns on the temperature lamp L2, indicating that the regulator 10 is up to, or above the selected high temperature.

The field lamp L1 is on whenever terminal B of the regulator 10 is placed at or near ground by the internal circuitry of the regulator 10.

Transistors Q13 and Q14, and control pot (variable resistor) R16 supply an adjustable output voltage to terminal 2 of the regulator 10. Resistor R14 provides overload protection by limiting the current at the output of Q13 of terminal 2 is shorted. The control pot R16 controls the output voltage of Q13 by setting the base current of Q13 which is in a series pass connection. Transistor Q14 places one end of control pot R16 at ground, providing the regulator 10 has continuity between terminals 1 and A.

The circuit components of the tester of FIG. 3 which are in dotted line blocks have the locations shown in FIG. 1. the remainder of the circuit components shown in FIG. 3 serve their normal circuit functions consistent with the circuit description given above, and consistent with the detailed description of the test procedures given below.

In a typical use, the invented tester operates as follows: At the start of a test procedure, the holder cover 24 is in its open position shown in FIG. 1, and the knob 28 is turned all the way counterclockwise to open the off-on switch SW1. A voltage regulator 10 is then placed on the holder bottom 22 such that its registration pins are received within the registration pin apertures 22a, 22b, and 22c and such that its terminals make electrical contact with the correspondingly numbered contacts of the bottom holder 22. Then, the holder cover 22 is closed and is secured in its closed position by the retaining spring 26. The tester is now ready to start a test procedure.

One example of a test procedure follows:

1. This is a low temperature (room temperature) test for proper electrical contact between the regulator terminals and the tester, for proper internal connection between terminals A and 1 of the regulator 10, for proper operation of the battery disconnect protection circuit 10c, and for shorting of the field current switch circuit 10d. Indications of the test results are provided by the field lamp L1 (which should remain off) and by the voltmeter V (which should indicate 0 volts).

For this test, the knob 28 is turned clockwise, but only until the switch SW1 is closed. At this time Q14 should be on and Q13 should be off, such that the voltmeter V should read 0 volts. If it does not read 0 volts, either the internal connection within the regulator 10 between terminals A and 1 is open or the regulator is not making proper contact with the terminals of the tester, such that the base of Q14 is at ground, Q14 is not conducting, and hence, Q13 is conducting. The field lamp L1 should remain off because the field current switch circuit 10d of the regulator 10 should be off since the base of the transistor TR 3 which forms the battery disconnect protection circuit of the regulator 10 is at 0 volts, which simulates a disconnected battery. If the field lamp L1 is on, the field current switch circuit 10d may be shorted, or the regulator curcuit 10c is not operating properly.

2. This is a low temperature-high current test of the field current switch circuit 10d, a low temperature and relatively low voltage test of the voltage level sensor circuit 10b, and a test to see if any of the other regulator circuits open at low temperature. The field lamp L1 and the voltmeter V provide indications of the test results.

For this test, the knob 28 is turned clockwise, without pausing, until the voltmeter reads a selected relatively low voltage, for example, about 5 volts. The field lamp L1 should now be on because this simulates a battery that is charged to only about 5 volts, and the field current switch circuit 10d should be on. With the field current switch circuit 10d on, the field lamp L1 is between the emitter voltage of Q1 and ground, and high test current flows through the transistor Q10, the thermal switch TS1 and the field current switch circuit 10d to ground. Since the field current switch circuit 10d has just been turned on, and hence, the current through Q10 has just started, the temperature of the test chamber 24a has not yet risen, and this is a test of the regulator 10 at low temperature. If the field lamp L1 is not on at this point, one or more of the regulator circuits have opened at low temperature, or the voltage level sensor circuit 10b is defective.

3. This is a test of the operation of the regulator 10 at low temperature and high current, and at high simulated battery voltage. Indications of the test results provided by the field lamp L1 and the voltmeter V. For this test, the knob 28 is turned clockwise until the field lamp L1 turns off. The voltmeter V should read a selected high voltage, for example, between 14 and 15.5 volts. If the field lamp L1 does not turn off, or if the voltmeter V does not read with the desired limits, the voltage level sensor circuit 10b of the regulator may be defective.

This test simulates a car battery which is at such high voltage that it should not be charged any further. Since the voltage at the emitter of Q13 (which is measured by the voltmeter V) is higher than the desired battery voltage, a Zener diode DVL in the voltage level sensor circuit 10b of the regulator 10 turns on. This turns on transistor TR2, which turns off transistor TR1 in the field current switch circuit 10d of the regulator.

4 This is a test of the voltage regulator at high current, low temperature and relatively low voltage, and simulates a battery that needs charging. Indications of the test results are provided by the field lamp L1 and the voltmeter V. For this test, the knob 28 is turned counterclockwise until the voltmeter V reads a selected low voltage, for example, about 12 volts. The field lamp L1 should turn on, since the field current switch circuit 10d should be on.

Up until this time, the regulator 10 is at a relatively low temperature, and the temperature lamp L2 should remain off. The temperature lamp L2 is therefore an additional indication of the test results so far.

In order to raise the temperature of the regulator 10, the knob 28 is left in its present position, so that the field current switch circuit 10d is on and draws high test current through the transistor Q10. This goes on for several minutes.

Referring to FIG. 1, the transistor Q10 is a power transistor which is mounted on a heat sink plate 24b, and is thus in a heat exchange relationship with the test chamber 24a. The heat dissipated by the power transistor Q10 and its heat sink 24b heats up the regulator 10 mounted in the test chamber 24a. The thermal switch TS1 is also mounted on the heat sink plate 24b. Thus, when the temperature of the heat sink plate 24b, and hence, the temperature of the test chamber 24a and of the regulator 10 received therein, reach a certain selected level, for example, 240°F., the thermal switch TS1 opens.

When the thermal switch TS1 opens, the high test current through Q10 is discontinued, Q9 turns off and Q8 turns on to light up the temperature lamp L2. A low test current now flows through the lamp L2 and the field switch 10d. The regulator 10 is now ready for high temperature tests.

5. This is a test of the regulator 10 at high temperature and at high and low current. High test current is applied to the regulator 10 for as long as the temperature lamp L2 is off. Low test current is applied to the regulator 10 as soon as the temperature lamp 12 turns on. The field lamp L1 should remain on both before and after L2 turns on. An indication of the test results is provided by the field and temperature lamps L1 and L2 and by the voltmeter V.

When the temperature lamp L2 turns on to indicate that the regulator 10 has reached the selected high temperature, both the temperature lamp L2 and the field lamp L1 should be on. If the temperature lamp L2 does not turn on after a reasonable period, for example, after L1 has been for about five minutes, the field current switch circuit 10d of the regulator 10 may be defective. If the field lamp L1 turns off during this period, the field current switch 10d in the regulator 10 may be opening at high temperature.

6. After the tests discussed above, the tester is turned off by opening the switch SW1.

At this time the regulator 10 in the test chamber 24a is at a high temperature, and the next test steps are for testing the regulator at high temperature.

7. This is a high temperature test of the regulator 10, and particularly of the field switch circuit 10d and the internal connection between terminals A and 1.

For this test, the knob 28 is turned clockwise, but only until the off-on switch SW1 is closed. The voltmeter V should read zero volts at this time. If it does not, the internal connection between the regulator terminals A and 1 has opened at high temperature. The field and temperature lamps L1 and L2 should remain off. If either the field or the temperature lamps L1 and L2 is on, or if both are on, the field current switch circuit 10d has shorted at high temperature or 10c has failed.

8. This is a low current, high temperature, low voltage test of the voltage level sensor circuit 10b and other internal circuits of the regulator 10.

For this test, the knob 28 is turned clockwise, without pausing, until the voltmeter V reads a selected relatively low voltage, for example, about 5 volts. The field and temperature lamps L1 and L2 should turn on. If they are not on, one or more of the regulator circuits have opened at high temperature or the voltage level sensor circuit 10b is defective.

9. This knob a high temperature, low current and high voltage test.

For this test, the knob 21 is turned further clockwise until the field and temperature lamps L1 and L2 turn off. The voltmeter V should read within a selected range at this time, for example, between about 12.5 and 14 volts. If the field and temperature lamps do not turn off, or if the voltage is not within the selected limits, the voltage level sensor circuit 10b within the regulator may be defective. This simulates an operating condition at which the voltage regulator is hot and the car battery is charged sufficiently and needs no further charging.

10. This is a high temperature-high current test at both high and low applied voltage. It simulates a car battery which needs charging when the regulator 10 is at a high temperature.

For this test, the knob 28 is turned clockwise until the voltmeter V reads a selected lower voltage, for example, 12 volts. Both the field and the temperature lamps L1 and L2 should turn on.

11. When the temperature lamp L2 turns off because the temperature in the test chamber 24a has dropped below a selected level, the tester is turned off by opening the off-on switch SW1.

12. This is a high temperature test which simulates a disconnected car battery. The knob 28 is turned clockwise to close the switch SW1. The field lamp L1 and the temperature lamp L2 should be off. If they are on, the field current switch circuit 10d may be shorted. With the temperature lamp L1 off, the voltmeter V should read zero volts. If it does not, the internal connection between the regulator terminals A and 1 has opened at high temperature with high current. The field lamp L1 should remain off. If it is on, the field current switch circuit 10d in the regulator has shorted at high temperature with high current.

13. This is a high temperature-high current test of the regulator 10 and simulates an operating condition at which the regulator 10 is hot and the car battery needs charging.

For this test, the knob 28 is turned further clockwise until the voltmeter reads a selected relatively low voltage, for example, 5 volts. The field lamp L1 should be on, because this simulates a car battery that needs charging. If the field lamp L1 is not on, one or more of the regulator circuits have opened at high temperature with high current, or the voltage level sensor 10b is defective.

14. This is a high temperature test of the regulator 10 at high test current.

For this test, the knob 28 is turned further clockwise until the field lamp L1 turns off to simulate transition from a battery which needs charging to one that does not need charging. The volmeter V should read a selected high voltage, for example, between 12.5 and 14 volts. If the field lamp L1 does not turn off, or if the voltage is not within the selected limits, the voltage level sensor circuit 10b of the regulator may be defective at high temperature with high current.

15. The tester is turned off by opening the switch SW1, and the regulator 10 is removed. This completes a test sequence.

In addition to the exemplary test procedure of steps 1–15, the tester provides connection to external probes for in situ testing of electrical circuitry. Referring to FIG. 3, a lead 30 provides a steady DC voltage, for example, 16.5 volts, a lead 32 provides either a high test current (e.g., 3.5 amperes) or a low test current (e.g., 0.26 amperes) depending on the temperature inside the test chamber 24a, a lead 34 simulates the generator indicator lamp circuit of an automobile, a lead 36 provides a selectively variable voltage ranging from 0 volts to about 16 volts controlled by the pot R16 through the knob 28, and a lead 38 is a ground lead. These leads, with suitable probes attached thereto, may be used for in-car tests of the generator/regulator circuits or for suitable continuity tests.

Thus, the tester includes: means for testing the field circuit 10d of the voltage regulator 10 at low temperature and high current, e.g., the means for providing high test current through the thermal switch TS1 at the start of the test procedure, when the regulator is at or near low (room) temperature; means for testing the field circuits at high temperature and high current, e.g., the means for providing high test current through the thermal switch TS1 near the end of the test procedure, after the regulator 10 has been suitably heated up; means for testing the field circuit at high temperature and low current, e.g., the means for providing low test current through the field lamp L1 after the regulator 10 has been heated up to the point where the thermal switch TS1 has opened to discontinue the high test current through Q10; and means for indicating the results of each test, e.g., the voltmeter V and the lamps L1 and L2. The tester further includes means for testing the battery disconnect protection circuit 10c, e.g., as in steps 1 and 7 of the test procedure described above; means for testing the voltage level sensor circuit 10b, e.g., as in steps 2, 3, 4, 5, 8, 9, 10, 13 and 14; and means for testing the temperature compensation circuit 10a, e.g., as in steps 3 and 14.

I claim:

1. A tester for voltage regulators each having a field current switch circuit, said tester comprising:
    means for testing the field current switch circuit of a voltage regulator at a low temperature with a high test current applied to said field current switch circuit;
    means disposed in heat exchanging relationship with said field current switch circuit and responsive to said high test current for gradually raising its temperature and thereby raising the temperature of said field current switch circuit;
    means responsive to the raising of the temperature of said field current switch circuit for testing the field circuit of the voltage regulator at a high temperature with said high test current;
    means responsive to the reaching of a defined threshold level by said raised temperature for testing the field circuit of the voltage regulator at a high temperature with a test current which is low as compared to said high test current; and
    means for indicating the results of each of the tests at a low temperature and a high test current, at a high temperature and a high test current and at a high temperature and a low test current.

2. A tester as in claim 1 wherein the voltage regulator includes a battery disconnect protection circuit and the tester includes means for testing said protection circuit at high temperature and at low temperature.

3. A tester as in claim 2 wherein the voltage regulator includes a voltage level sensor circuit, and the tester includes means for testing said sensor circuit at high temperature and at low temperature.

4. A tester as in claim 3 wherein the means for testing the voltage level sensor circuit include means for testing the sensor circuit at high and low voltage.

5. A tester as in claim 4 wherein the voltage regulator includes a temperature compensation circuit, and the tester includes means for testing said compensation circuit at low and high temperature.

6. A tester as in claim 1 wherein the voltage regulator includes a voltage level sensor circuit and the tester includes means for testing the sensor circuit at high and low temperature.

7. A tester as in claim 6 wherein the means for testing the voltage level sensor circuit include means for testing the sensor circuit at high and low voltage.

8. A tester as in claim 7 wherein the voltage regulator includes a battery disconnect protection circuit and the tester includes means for testing said protection circuit at high and low temperature.

9. A tester as in claim 8 wherein the voltage regulator includes a temperature compensation circuit and the tester includes means for testing said compensation circuit at low and high temperature.

10. A tester as in claim 1 wherein the voltage regulator includes a temperature compensation circuit and the tester includes means for testing said compensation circuit at low and high temperature.

11. A tester as in claim 10 wherein the voltage regulator includes a battery disconnect protection circuit and the tester includes means for testing said protection circuit at high and low temperature.

12. A tester as in claim 11 wherein the voltage regulator includes a voltage level sensor circuit and the tester includes means for testing said sensor circuit at high and low temperature.

13. A tester as in claim 12 wherein the means for testing the sensor circuit includes means for testing the sensor circuit at high and low voltage.

14. A tester as in claim 1 wherein the voltage regulator includes a voltage level sensor circuit and the tester includes means for testing the sensor circuit at low and high voltage.

15. A tester comprising:
    a test chamber for receiving a voltage regulator for testing; and
    means for applying a test current to the voltage regulator, said means comprising a first current source circuit including a power transistor through which said test current passes, said transistor disposed in a heat exchange relationship with said test chamber and the voltage regulator received therein, whereby the said of test current to the voltage regulator raises the temperature in the test chamber by heat transfer thereto from siad power transistor, and the voltage regulator is tested at lower temperature at the start of the current through the transistor and at a higher temperature at a later time.

16. A tester as in claim 15 wherein the means for applying test current include:
    a second current source circuit;
    temperature responsive switch means disposed in a heat exchange relationship with the test chamber and connected to the first and second current source circuit for discontinuing the test current through the first current source circuit and for establishing a test current through the second current source circuit when the temperature in the test chamber exceeds a first selected level and for discontinuing the test current through the second current source circuit and for establishing the test current through the first current source circuit when the temperature in the test chamber falls below a second selected level.

17. A tester as in claim 16 wherein the current through the first source circuit is a relatively high current and the current through the second source circuit is a relatively low current, whereby the voltage regulator in the test chamber is tested, in sequence, at low temperature and high test current, at high temperature and low test current, and at high temperature and high test current.

18. A tester as in claim 17 wherein the voltage regulator received in the test chamber has a field current switch circuit and the test current is applied to said field current switch circuit.

19. A tester as in claim 18 wherein the voltage regulator includes a battery disconnect protection circuit and the tester includes means for testing said protection circuit at high and low temperature.

20. A tester as in claim 19 wherein the voltage regulator includes a voltage level sensor circuit and the tester includes means for testing the sensor circuit at high and low temperature.

21. A tester as in claim 20 wherein the voltage regulator includes a temperature compensation circuit and the tester includes means for testing the compensation circuit at low and high temperature.

22. A tester as in claim 18 wherein the voltage regulator includes a voltage level sensor circuit and the tester includes means for testing the sensor circuit at high and low temperature.

23. A tester as in claim 18 wherein the voltage regulator includes a battery disconnect protection circuit and the tester includes means for testing the protection circuit at high and low temperature.

24. A tester as in claim 18 wherein the voltage regulator includes a temperature compensation circuit and the tester includes means for testing the compensation circuit at low and high temperature.

25. A tester for electrical devices comprising:
a test chamber for receiving a device for testing;
a current source circuit for applying a test current to the device in the test chamber, said circuit including:
 current passing means disposed in heat exchange relationship with said test chamber and generating heat when passing current, and
 means defining a first current path for passing current through said current passing means and for applying said current to the device, whereby the test chamber and the device received therein are heated when current is passing through said first path; and
temperature responsive switch means disposed in heat exchange relationship with said test chamber and means defining a second current path, said temperature switch means establishing a test current through said first path when the temperature in the test chamber is below a selected level and establishing a test current through said second path when the temperature in the test chamber is above a selected level.

26. A tester as in claim 25 wherein the test current through the first path is a relatively high current and the test current through the second path is a relatively low current, whereby the device received in the test chamber is tested, in sequence, at low temperature and high current, high temperature and low current and high temperature and high current.

27. A method of testing electrical devices comprising:
providing a test chamber for a device for testing;
applying a first test current to the device therein through a first current source circuit that includes a current passing means disposed in a heat exchange relationship with the test chamber and generating heat when passing current, whereby the application of test current to the device raises the temperature of the test chamber by heat transfer thereto from the current passing means, for testing the device at lower temperature at the start of the test current and at a higher temperature at a later time; and
detecting the temperature of the device, permitting the first test current only when the device temperature is below a selected level, and applying a second test current when the device temperature is above a selected level, said first and second current being high and low current respectively, thereby testing the device, sequentially, at low temperature and high current, at high temperature and high current and at high temperature and low current.

28. A method of testing voltage regulators each having a field current switch circuit comprising the steps of:
testing the field current switch circuit of a voltage regulator at a low temperature by applying a high test current to said field current switch circuit;
raising the temperature of said field circuit by providing a current responsive device disposed in a heat exchanging relationship with said field current switch circuit and gradually raising the temperature of said device by said high test current therethrough;
testing the field current switch circuit of the voltage regulator after its temperature has been raised to a high temperature by applying thereto said high test current;
testing the field current switch circuit of the voltage regulator substantially at said high temperature by applying thereto a test current which is low as compared to said high test current; and
indicating the results of each of said tests at a low temperature and a high test current, at a high temperature and a high test current and at a high temperature and a low test current.

29. A method as in claim 28 wherein the voltage regulator includes a battery disconnect protection circuit and including the additional step of testing the protection circuit at high temperature and at low temperature.

30. A method as in claim 28 wherein the voltage regulator includes a voltage level sensor circuit and including the additional step of testing said sensor circuit at high and at low temperature.

31. A method as in claim 30 including the additional step of testing the sensor circuit at high and at low applied voltage.

32. A method as in claim 28 wherein the voltage regulator includes a temperature compensation circuit, and including the additional step of testing the compensation circuit at low and at high temperature.

* * * * *

PO-1050
(5/69)

UNITED STATES PATENT OFFICE
CERTIFICATE OF CORRECTION

Patent No. 3,898,561      Dated August 5, 1975

Inventor(s) Thomas H. Leighton, Sr.

It is certified that error appears in the above-identified patent and that said Letters Patent are hereby corrected as shown below:

IN THE SPECIFICATION

Col. 4, line 20 delete "from" and insert -- form --.
Col. 5, line 24 after "put of Q13" delete "of" and insert -- if --
Col. 6, line 43 delete "with" and insert -- within --.
Col. 7, line 38 after "has been" insert -- on --.
Col. 8, line 3 delete "knob" and insert -- is --.
Col. 8, line 33 delete "L1" and insert -- L2 --.

IN THE CLAIMS

Col. 10, line 55 delete "said" and insert -- application --.
Col. 10, line 57 delete "siad" and insert -- said --.

Signed and Sealed this second Day of March 1976

[SEAL]

Attest:

RUTH C. MASON
*Attesting Officer*

C. MARSHALL DANN
*Commissioner of Patents and Trademarks*